United States Patent
Maxwell

(12) 
(10) Patent No.: US 6,179,306 B1
(45) Date of Patent: Jan. 30, 2001

(54) WHEELED TOOL CARRIER

(76) Inventor: Carolyn Maxwell, 3507 Oleha Dr., Apopka, FL (US) 32703

( * ) Notice: Under 35 U.S.C. 154(b), the term of this patent shall be extended for 0 days.

(21) Appl. No.: 09/119,387

(22) Filed: Jul. 20, 1998

(51) Int. Cl.[7] ........................................ B62B 1/00
(52) U.S. Cl. ............... 280/47.26; 280/43.1; 280/47.131; 280/47.17; 280/652
(58) Field of Search ................. 280/33.992, 35, 280/38, 40, 43.1, 47.131, 47.17, 47.19, 47.26, 659, DIG. 4

(56) References Cited

U.S. PATENT DOCUMENTS

| | | | |
|---|---|---|---|
| 2,883,731 | * 4/1959 | Wells | 280/47.19 |
| 3,145,301 | * 8/1964 | Wilkinson | 280/47.35 |
| 3,894,748 | * 7/1975 | Ratcliff | 280/47.35 |
| 3,897,080 | * 7/1975 | Isom | 280/47.19 |
| 4,302,024 | * 11/1981 | Weddle | 280/47.33 |
| 4,355,818 | * 10/1982 | Watts | 280/654 |
| 4,936,594 | * 6/1990 | Oliver, III | 280/47.19 |
| 4,947,998 | * 8/1990 | Smeller | 280/35 |
| 5,074,571 | * 12/1991 | Reese | 280/47.19 |
| 5,203,579 | * 4/1993 | Lipschitz | 280/33.991 |
| 5,203,815 | * 4/1993 | Miller | 43/21.2 |
| 5,333,885 | * 8/1994 | Pullman | 280/47.19 |
| 5,380,033 | * 1/1995 | Harling | 280/47.19 |
| 5,390,944 | * 2/1995 | Sherwin | 280/47.35 |
| 5,464,237 | * 11/1995 | Saporiti | 280/47.19 |
| 5,611,560 | * 3/1997 | Thimmig | 280/642 |
| 5,673,928 | * 10/1997 | Jury | 280/645 |
| 5,833,250 | * 11/1998 | Schier et al. | 280/47.19 |
| 5,853,189 | * 12/1998 | Swartzlander | 280/652 |
| 5,887,878 | * 3/1999 | Tisbo et al. | 280/47.19 |

* cited by examiner

*Primary Examiner*—J. J. Swann
*Assistant Examiner*—L. Lum
(74) *Attorney, Agent, or Firm*—Brian S. Steinberger; Law Offices Of Brian S. Steinberger

(57) ABSTRACT

A wheeled tool carrier for carrying and supporting yard and tool implements and garden accessories. The tool has a cylindrical canister having a grid cover for allowing longitudinal handles of shovels, rakes, hoes to be inserted therein. A hinge connected bent handle allows the user either drag the carrier behind them or to push the carrier in front to the job site. Attached around the sides of the canister are various hooks such as S-shapes, J-shapes and U-shapes for carrying various items such as small handtools such as shovels, gloves, hats, towels, umbrellas, garden hoses, rope and the like. A arm can be attached to the canister for allowing rollable materials such as paper towels, and garbage bags to be dispensed. A side storage drawer allows smaller items such as fasteners, small tools and sprinkler type components to be stored therein. Attached to the lower front of the canister is a spring loaded shelf that can support bags of mulch, dirt, seeds, peat moss, and debris, as well as holding plantings and the like. Adjustable stabilizer feet can be underneath the canister or the shelf to stabilize the canister. Large dual bicycle type wheels on opposite sides of the canister allow the carrier to traverse terrain in gardens and yards.

17 Claims, 3 Drawing Sheets

WHEELED TOOL CARRIER

This invention relates to carts, and in particular to a large wheeled cart for carrying and storing yard and garden tools, implements and large heavy bags of mulch, seeds, and the like.

BACKGROUND AND PRIOR ART

People often use many tools and implements when taking care of their gardens, lawns, shrubbery, plantings and the like. Gardeners typically use gloves, small and large shovels, hoes, rakes, and garden hoses, garbage-refuse bags, and heavy bags of seeds, mulch, moss, etc. Often the gardener must hand carry over several trips these items to work site. Finally, these items must be hand carried back to be put back onto racks, shelves in storage sheds, garages, and basements.

The inventor is aware that there are two wheel hand truck golfbag carts. However, these handtruck golfbag carts are not built to carry and store all the types of yard/garden tools and implements described above. For example, handshovels, water hoses and large bags of peat moss, mulch, etc. cannot be carried by these carts. Furthermore, the golfbag cart has small wheels which are suitable for being rolled over smooth manicured golf courses, but not for being pulled and rolled over irregular terrain surfaces(rocks, sharp angled hills) such as those found in yards and gardens.

Other devices known types of dual wheeled carts include collapsible wire grid type grocery carts. However, the frames of the grocery carts is so light weight that it would not be able to carry the various types of yard/garden tools and implements described above, and would not be able to support the weights of over 100 pounds. Furthermore, handshovels and water hoses cannot be safely attached and carried by these carts. Furthermore, these carts cannot carry large bags of peat moss, mulch that is often used in yards and gardens. Furthermore, grocery carts like the golfbag carts have small wheels which make them suitable for being pulled and rolled over flat floor/ground surfaces, but not for being pulled and rolled over irregular terrain surfaces(rocks, sharp angled hills) such as those found in yards and gardens. Still furthermore, the short handle on the grocery cart does allow these carts to carry long handle implements like hoes and shovels.

A device entitled the "Gardener's TOTE TREE™, has been advertised in the Gardeners Emporium Section Advertisement section of the Horticulture Magazine, July/August 1998 edition. This wheeled device is described as a wooden cage for storing the handles through top slots in the cage. Similar to the problems described above, the TOTE TREE device has small wheels, no storage available for small components, and no space for storing bags of peat moss, mulch that is often used in yards and gardens.

SUMMARY OF THE INVENTION

The first objective of the present invention is to provide a garden and yard cart that is able to be easily pulled and rolled over irregular terrain surfaces.

The second object of this invention is to provide a garden and yard cart that is able to carry various large, small and irregular shaped yard/garden tools and implements.

The third object of this invention is to provide a garden and yard cart that is able to carry and store yard/garden tools and implements up to approximately 125 pounds.

A preferred embodiment of the wheeled tool carrier cart for carrying and storing yard tools, includes a hollow cylindrical housing having an open grid top; and a substantially closed bottom that allows water to drain through, dual large bicycle size wheels on each side of the cylindrical housing allow the cart to be pulled and pushed over various garden, yard terrains. A U-shaped bent handle has ends hingedly attached to the cylindrical housing allows the cart to be movable.

The tools that can be inserted through the grid are the longitudinal handles a rake, shovel and hoe. Various hooks such as U-shaped hooks, a J-shaped hooks, and a S-shaped hooks on the sides of the carrier support gloves, handtools, hats, and towels, garden hoses, ropes and an umbrella. A arm can be attached to the canister for allowing rollable materials such as paper towels, and garbage bags to be dispensed. A side storage drawer allows smaller items such as fasteners, small tools and sprinkler type components to be stored therein. At least one stabilizer foot can protrude downward from the cylindrical housing. A foldable shelf is pivotally attached to an exterior about the bottom of the cylindrical housing. The shelf can support weighted material such as bags of peat moss, dirt, mulch, seeds, and debris.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
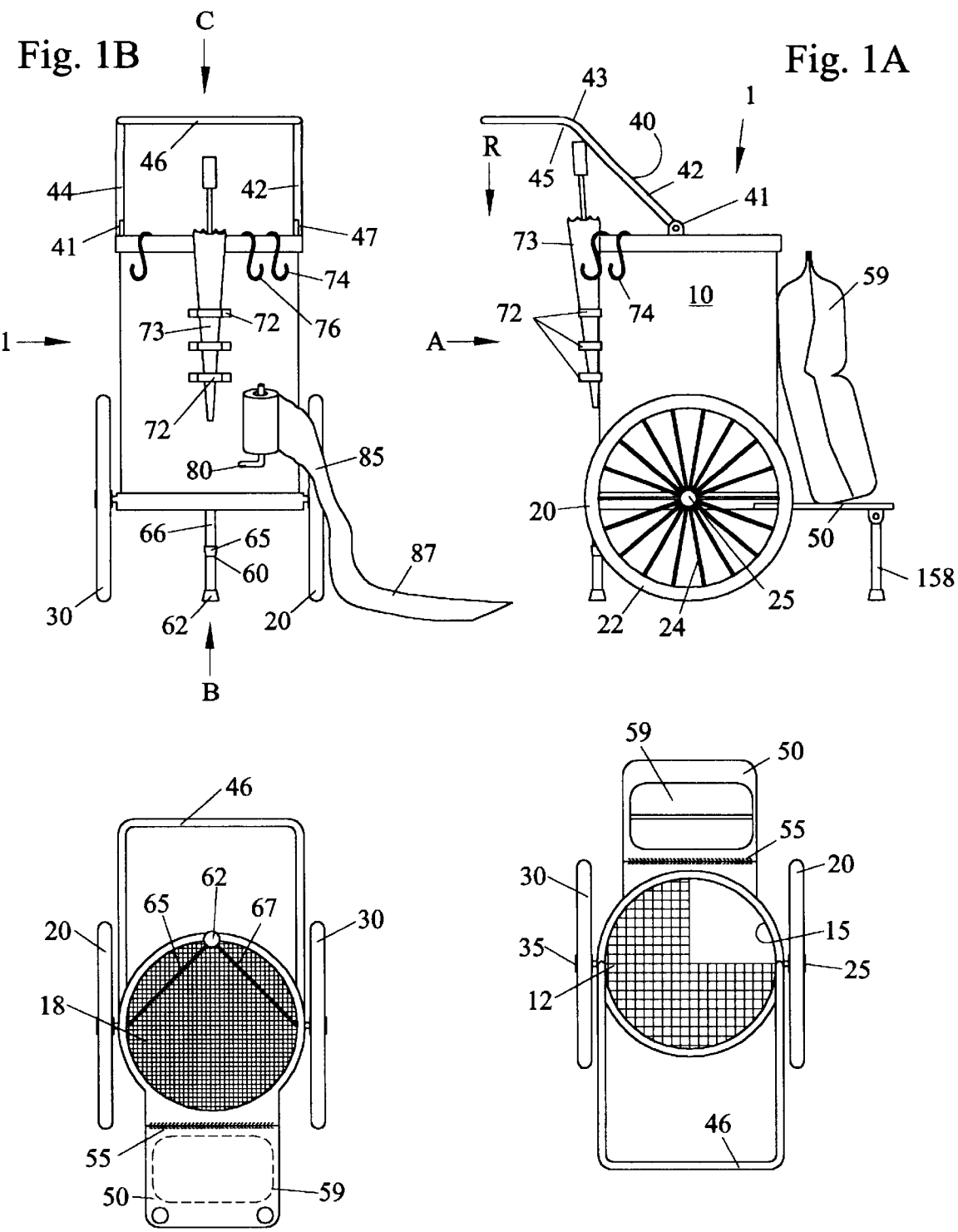
FIG. 1A is a side view of the novel wheeled tool carrier cart of the subject invention.
FIG. 1B is a rear view of the wheeled tool carrier cart of FIG. 1A along arrow A.
FIG. 1C is a bottom view of the wheeled tool carrier cart of FIG. 1B along arrow B.
FIG. 1D is a top view of the wheeled tool carrier cart of FIG. 1B along arrow C.

FIG. 1A is a side view of the novel wheeled tool carrier cart 1 of the subject invention. FIG. 1B is a rear view of the wheeled tool carrier cart 1 of FIG. 1A along arrow A. FIG. 1C is a bottom view of the wheeled tool carrier cart 1 of FIG. 1B along arrow B. FIG. 1D is a top view of the wheeled tool carrier cart 1 of FIG. 1B along arrow C.

Referring to FIGS. 1A–1D, cart 1 includes hollow cylindrical housing 10 approximately 20" high, with a diameter of approximately 12 to approximately 16". A top circular grid 12 on top of cylindrical housing 10 has a ¼ size opening 15, where the the grid 12 has spaces(approximately 2 to 4 inches wide) that are large enough to allow longitudinal handles of tools (shown more clearly in FIG. 2) such as shovels and rakes to pass through. A substantially closed bottom 18 of the cylindrical housing 10 can be a grid with smaller spacings so that only water can pass therethrough.

Attached adjacent to the bottom of cylindrical housing 10 are dual large wheels 20, 30 attached by axle pins 25, 35, respectively to the housing 10. Each of the dual wheels 20, 30 can be bicycle type wheels having rims with diameters of approximately 16" to approximately 24". Referring to wheel 20, a rim backed rubber tire 22(either solid or air-filled) is connected to axle pin 25 by plural spokes 24. The components in wheels 20, 30 can be plastic, aluminum, galvanized metal, and the like.

Attached to the upper edges of the cylindrical housing 10 curved handle 40. The curved handle 40 has a pair of vertical upwardly angled longitudinal arms 42, 44 each having bottom ends which pivot about hinges 41, 47 to upper edges of cylindrical housing 10. Hinges 41, 47 can allow the entire handle to rotated downward in the direction of arrow R to abut against the side of housing 10. Alternatively, hinges 41, 47 can have limited pivoting movement so that arms 42, 44 generally stay in an upwardly angled position approximately 45 degrees from the vertical axis down cylindrical housing 10. A slight bend of approximately 45 degrees at points 43, 45 connects the arms 42, 44 to a U-shaped gripping member 46 approximately 12 to approximately 16" across. Curved handle 40 can be made from molded plastic, aluminum, galvanized metal, and the like.

Figure 2:
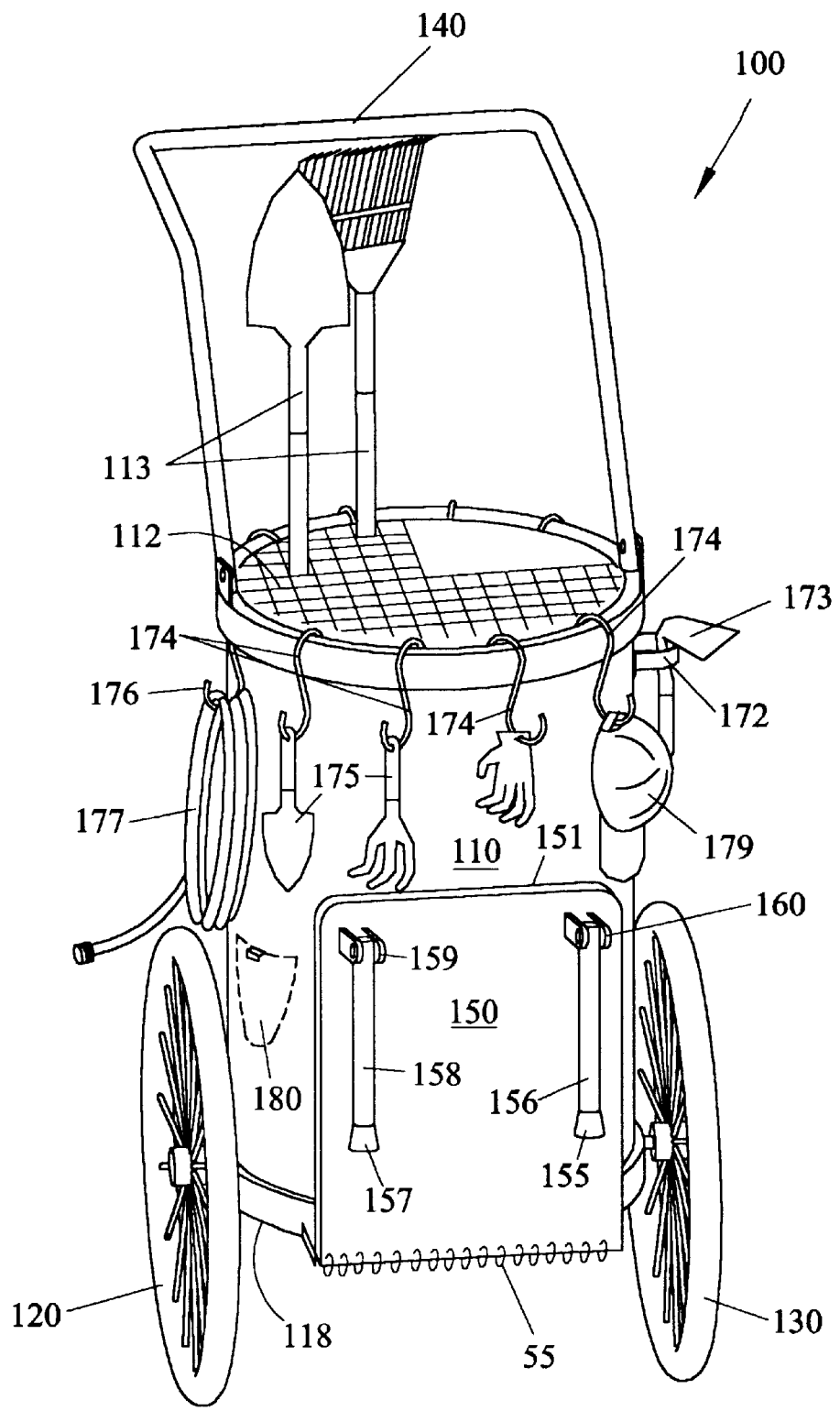
FIG. 2 is a front view of a second embodiment of the wheeled tool carrier cart of FIGS. 1A–1D.

Attached to the lower front of cylindrical housing 10 is a folding shelf 50 having spring-loaded hinges 55 which generally keep the shelf 50 biased in an upright position laying against the side of cylindrical housing 10. Weighted objects 59 such as a 10 lb bag of seed, peat moss, dirt and the like, keeps the shelf in a downward load position. Underneath cylindrical housing 10 is a triangular supports 65, 67 with a stabilizer leg 60 and foot 62. Leg 60 can be adjustable with one member 66 telescoping threaded into another member 65 so that the height of leg 60 can be adjusted allowing carrier 1 to be stable depending on the tools and load carried and stored by carrier 1. Attached about upper edges of cylindrical housing 10 can be S-shaped hooks 74, J-shaped hooks 76, which are shown in FIG. 2 to support various tools and yard implements and garden accessories outside carrier 1, such as but not limited to hoses, gloves, hats, hand tools, and the like. Vertical U-shaped hooks 72 can be aligned down the side of carrier 1 and carry an umbrella 73 and the like. As shown in FIG. 1B, a vertical L-shaped arm 80 can be attached to the lower rear portion of the cylindrical housing 10. A cylindrical roll 85 of paper towels, plastic garbage bags, and the like can be dispensed from the arm 80. The garbage bags can be filled with debris and brought back by being stored on the folding shelf 50. Users can allow the dispensed roll 87 to be used as knee pad protection when kneeling in the yard.

FIG. 2 is a front view of a second embodiment 100 of the wheeled tool carrier cart 1 of FIGS. 1A–1D. Referring to FIG. 2, cylindrical housing 110, top grid 112, bottom 118, wheels 120, 130, and handle 140 correspond to similar components described in FIGS. 1A–1D. Connected to upper edges of housing 110 are S-shaped hooks 174 for supporting small tools and yard implements 175 such as hand shovels and gloves, and hats 179. A side mounted J-shaped hook 176 can be used to support larger loose items 177 such as rope, a garden hose, and the like. Additional U-shaped hooks 172 can be pivotally attached to the sides of housing 110, for holding towels 173 or other items such as the umbrella 73 shown in FIGS. 1A–1B. A front shelf 150 can have a spring loaded hinge 55 which biases shelf 150 upward against the side of cylindrical housing 110. Stabilizer legs 156, 158 having feet portions 155, 157 at one end and hinges 160, 159 connected to the underside adjacent the front edge 151 of shelf 150. When shelf 150 is a downward load position with a weighted object (such as the bag of material 59 shown in FIG. 1A), legs 156, 158 extend downward with feet 155, 157 abutting against the ground so that carrier 100 is stable in relation to the ground. A pull-out storage drawer 180 can be used to store smaller items such as screw drivers, hammers, water sprinkler components (nozzles, spray heads, and the like) and fasteners (screws, nails, clips, and the like).

Figure 3:
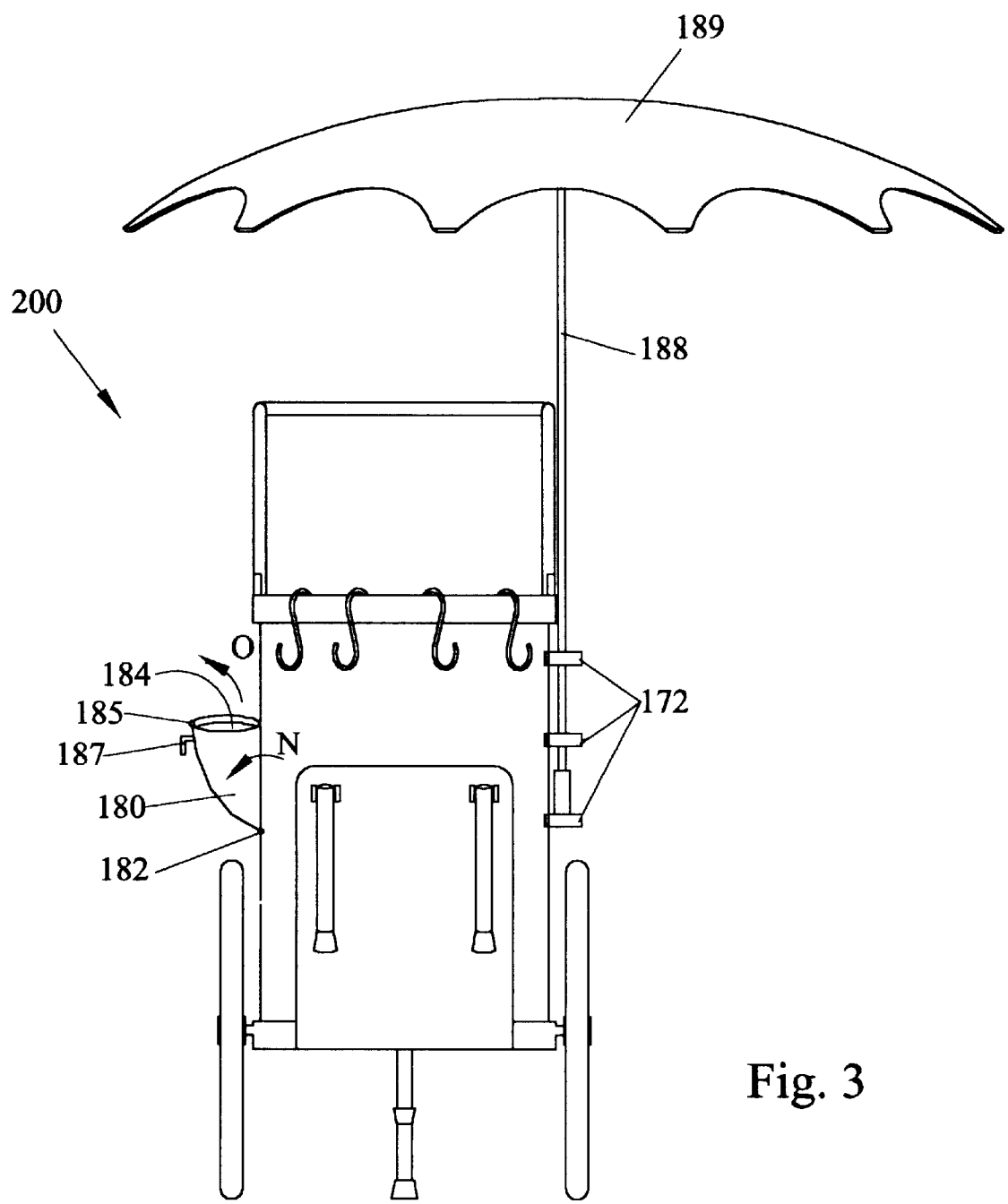
FIG. 3 is a front view of the embodiment of FIG. 2 with an umbrella in an extended position and a pull-out drawer in an extended position.

FIG. 3 is a front view of the embodiment 200 of FIG. 2 with an umbrella 189 in an extended position wherein the support pole 188 is held in place by the U-shaped couplers 172 so that users can have shade when working. Side handle 187 allows pull-out storage drawer 180 to pivot at bottom hinge 182 and open in the direction of arrow N. A pop-up top 184 can pivot at point 185 and open outward in the direction of arrow O, so that small items can be stored within the drawer.

Plastic caps can be used with the stabilizer feet of the subject invention so that the carrier can be stored indoors and not scratch and damage floor surfaces.

The lower shelf of the subject invention can have various dimensions such as but not limited to approximately 12" deep by approximately 10" wide.

The novel carrier cart of the subject invention can carry various weights of yard/garden implements, tools and accessories such as up to approximately 100 to approximately 125 pounds and more.

The novel invention can be applicable to other uses. For example, removing the grid top can allow the canister to be used to storing towels, toys and the like, so that the invention can be used on a beach sand terrain. The shelf can be used to store foldable lawn chairs, coolers, and the like, where straps such as bungee cords can hold the items onto the shelf.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A wheeled tool carrier cart for carrying and storing yard tools, comprising:

a hollow housing having substantially closed sides, an open top and a substantially closed bottom;

a grid having openings covering approximately ¾ of the open top, each of the openings being approximately 2 to approximately 4 inches wide for passing longitudinal handles of tools chosen from at least one of a rake, shovel and hoe, the grid having a substantially triangular shape through-hole covering approximately ¼ of the open top;

dual wheels attached to the housing, each of the dual wheels having a diameter at least as large as a diameter of the housing; and a handle having at least one end attached to the housing, wherein yard tools can be stored and carried by the housing.

2. The wheeled tool carrier cart of claim 1, wherein the housing includes:

a diameter of approximately 12 to approximately 14"; and a height of approximately 20 to approximately 28".

3. The wheeled tool carrier cart of claim 1, wherein the housing includes:

a first hook attached about and exterior to the open top of the housing for supporting items chosen from one of:

glove, handtool, hat, and towel.

4. The wheeled tool carrier cart of claim 3, wherein the housing includes:

a second hook attached about and exterior to a mid area between the open top and the bottom of the housing for supporting items chosen from one of:

garden hose, rope and an umbrella.

5. The wheeled tool carrier cart of claim 4, wherein the first hook and the second hook are chosen from at least one of:

a U-shaped hook, a J-shaped hook, and a S-shaped hook.

6. The wheeled tool carrier cart of claim 3, wherein the first hook is chosen from at least one of:

a U-shaped hook, a J-shaped hook, and a S-shaped hook.

7. The wheeled tool carrier cart of claim 1, further comprising:

a shelf pivotally attached to an exterior about the bottom of the housing, the shelf having at least one leg, the shelf and the leg each having a folded position parallel to the housing and a downward position for supporting weighted materials.

8. The wheeled tool carrier cart of claim 7, wherein the weighted material is chosen from at least one bag of:

peat moss, dirt, mulch, seeds, and debris.

9. The wheeled tool carrier cart of claim 1, wherein the dual wheels include:

diameters of approximately 16" to approximately 24".

10. The wheeled tool carrier cart of claim 1, wherein the handle includes:

a U-shape having an upper portion being bent in a horizontal position and a lower portion attached to the housing at an angle.

11. The wheeled tool carrier cart of claim 1, wherein the bottom of the housing includes:

a solid surface for supporting objects and an opening for allowing water and moisture to pass through.

12. The wheeled tool carrier cart of claim 1, wherein the housing includes:

an arm attached to a side wall; and a roll of material that can be dispensed from the arm.

13. The wheeled tool carrier cart of claim 1, wherein the housing includes:

a side storage drawer having a retracted position within the housing and an extended position outside of the housing for allowing small items to be stored therein.

14. A wheeled tool carrier cart for carrying and storing yard tools, comprising:

a hollow housing having substantially closed sides, an open top, and a substantially closed bottom for allowing water to pass therethrough;

a removable grid having pass through-openings each being approximately 2 to approximately 4 inches wide, covering approximately ¾ of the open top of the housing for passing longitudinal handles of tools therethough, a single triangular shaped through-hole covering ¼ of the open top, the tools chosen from one of:

rake, shovel and hoe;

large dual wheels attached to the housing, each of the dual wheels having a diameter at least as large as a diameter of a housing;

a curved handle having ends attached to the housing, wherein yard tools can be stored and carried by the housing;

a hook attached about and exterior to the housing for supporting garden and tool items, the hook is chosen from at least one of:

a U-shaped hook, a J-shaped hook, and a S-shaped hook; and the garden and the tool items chosen from at least one of: glove, handtool, hat, towel, garden hose, rope and an umbrella;

a ground engaging stabilizer foot protruding downward from the housing; and a shelf pivotally attached to an exterior of the housing, the shelf having at least one leg, the shelf and the leg each having a folded position parallel to the housing and a downward position perpendicular to the housing, the shelf for supporting a weighted material, the weighted material chosen from at least one bag of: peat moss, dirt, mulch, seeds, and refuse.

15. The wheeled tool carrier cart of claim 14, wherein the housing further includes:

an arm attached to a side wall;

a roll of material that can be dispensed from the arm; and a side storage drawer having a retracted position within the housing and an extended position outside of the housing for allowing small items to be stored therein.

16. A wheeled tool carrier cart, comprising:

a hollow cylindrical chamber having an open top, the open top having grid openings covering approximately ¾ of the open top, each of the openings being approximately 2 to approximately 4 inches in size, and a substantially triangular through-hole opening covering approximately ¼ of the open top, and a substantially closed bottom;

wheels attached about an exterior of the chamber for supporting the chamber thereon;

a handle attached to the chamber; and a shelf pivotally attached to an exterior about the bottom of the chamber, the shelf having at least one leg, the shelf and the leg each having a folded position parallel to the chamber and a downward position for supporting weighted materials.

17. The wheeled tool carrier cart of claim 16, wherein the handle includes: a U-shape having an upper portion being bent in a horizontal position and a lower portion attached to the chamber at an angle.

* * * * *